Patented Aug. 27, 1940

2,212,866

UNITED STATES PATENT OFFICE 2,212,866

PLASTIC CHLORINATED VEGETABLE FIBROUS MATERIAL

Earl C. Sherrard, Edward Beglinger, and John P. Hohf, Madison, Wis., and Ernest Bateman, deceased, late of Madison, Wis., by William T. Bateman, special administrator, Madison, Wis., assignors to Henry A. Wallace, Secretary of Agriculture of the United States of America No Drawing. Application January 28, 1938, Serial No. 187,567

2 Claims. (Cl. 260—9)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes, without the payment to us of any royalty thereon.

Our invention relates to a method of treatment whereby sawdust, wood waste, and similar vegetable fibrous materials can be rendered plastic and to the product resulting therefrom.

One object of our invention is a method of treatment of sawdust, wood waste, and similar cellulosic materials for the production of a product suitable for molding purposes Another object is the production of a substance resulting from the treatment of wood waste and similar cellulosic materials that when subjected to heat and pressure yields a substance that is high in strength, moisture-, water-, and fire-resistant, and that answers as an excellent dielectric. Further use of the term sawdust in this application shall be taken to include wood waste and similar vegetable fibrous materials.

In carrying out our invention, we prefer to employ any suitable type of closed apparatus capable of being heated and subjected to partial vacuum and having a suitable acid resistance.

We do not limit ourselves to vacuum chlorination, but find it a very convenient method for adding quickly and accurately known amounts of chlorine gas and for obtaining uniform chlorination of the batch. We have found that sawdust treated substantially in the manner hereinafter described yields a material which lends itself readily to molding under heat and pressure.

Tests have shown that when air-dry sawdust is treated with chlorine gas and the mixture is heated, an exothermic reaction takes place in the mixture, the reaction beginning at temperatures between 75° and 110° C., depending upon the amount of chlorine in the mixture. We have found that chlorine concentrations varying between 3 and 10 parts per 100 parts air-dry sawdust give satisfactory results, but we do not intend that the process shall be limited strictly to these proportions, but rather for special uses or conditions either higher or lower concentrations may be used, if desired, as is also the case in the composition of the plastic mixtures herein described. The resulting materials, after being thoroughly washed, still contain substantial amounts (0.5 to 4.0 percent) of combined chlorine, which we believe has an important bearing on their plastic properties. The molding may be done with or without the aid of plasticizers as desired, as stated below, the different molding mixtures having different characteristics as to finish, moisture resistance, strength, etc. We also have found that the addition of 3 to 10 parts of chlorine to 100 parts of air-dry sawdust, without any further pretreatment or the addition of any plasticizer, results in a material which is very plastic and can be molded under relatively low temperatures (90° to 135° C.) and pressures (500 to 1000 pounds per square inch).

The following examples are given to illustrate the preparation of our product:

*Example 1.*—One hundred parts of air-dry sawdust is placed in a vacuum-tight container; this is partially evacuated and 3.5 parts of chlorine gas admitted. After mixing, air is admitted and the temperature raised to about 100° C. for about 1 hour, at the end of which time the mixture is thoroughly washed with hot water to remove all acids and water-soluble reaction products, dried and finely ground. One hundred parts of the chlorinated, washed, and dried product is mixed to contain about 20 parts of water. This mixture is transferred to a heated mold, subjected to a pressure of about 3000 pounds per square inch and a temperature of 135° to 150° C. for about 15 minutes, the result being a hard, dense, vitreous-like product.

*Example 2.*—Under conditions as described in Example 1 but with the addition to 100 parts of chlorinated product of 6 parts of furfural, 6 parts of aniline, and 8 parts water.

*Example 3.*—Under the conditions set forth in Example 1, with the addition to 100 parts of chlorinated product sufficient furfural and aniline, in equal parts, and water to maintain the total added liquid content of the mixture at substantially 20 parts.

*Example 4.*—Under the conditions set forth in Example 1, with the addition to 100 parts of chlorinated product of 10 parts of phenol and 10 parts of water.

*Example 5.*—Under the conditions set forth in Example 1, with the addition to 100 parts of chlorinated product, 2 parts of barium hydroxide and 20 parts of liquids.

*Example 6.*—Under the conditions set forth in Example 1, with the addition to 100 parts of chlorinated product of 10 parts of hydrofuramide and, say, 5 parts of benzol or similar solvent.

*Example 7.*—Under the conditions set forth in Example 1, but with the addition to 100 parts of chlorinated product of 10 to 20 parts of Bakelite or similar commercial resin.

Having thus described our invention, what we claim for Letters Patent is:

1. A process for the production of a chlorinated, vegetable, fibrous material possessing the properties of plastic flow, under heat and pressure, which comprises chlorinating vegetable fibrous material in partial vacuum, releasing the vacuum and admitting air, thence heating the mixture at substantially 100° C. for substantially 1 hour, thence copiously washing, thereby removing the water-soluble products of the reaction, thence drying, and thence adding a plasticizer capable of exercising a plasticizing action on the chlorinated, vegetable, fibrous material.

2. The product derived from the process defined by claim 1.

EARL C. SHERRARD.
EDWARD BEGLINGER.
JOHN P. HOHF.
WILLIAM T. BATEMAN,
Special Administrator of Ernest Bateman, Deceased.